Oct. 28, 1958     TEICHI YAMADA     2,857,704
DIRECTIONAL BAIT SLIDING ATTACHMENT
Filed July 27, 1954
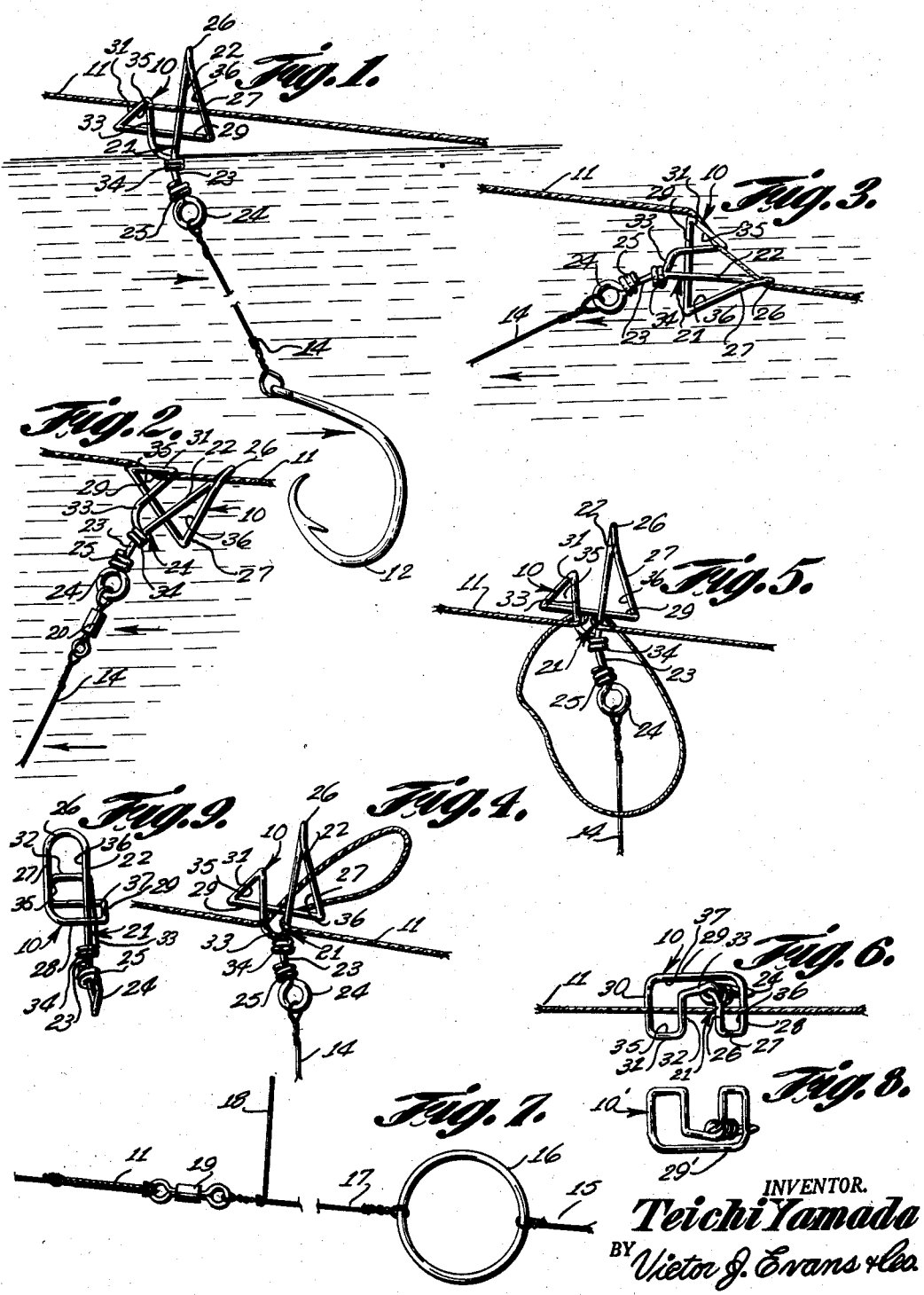
INVENTOR.
Teichi Yamada
BY Victor J. Evans + Co.

United States Patent Office 2,857,704
Patented Oct. 28, 1958

2,857,704

DIRECTIONAL BAIT SLIDING ATTACHMENT

Teichi Yamada, Makawao, Maui, Territory of Hawaii

Application July 27, 1954, Serial No. 446,097

1 Claim. (Cl. 43—44.85)

This invention relates to fishing equipment, and more particularly to a directional bait sliding attachment for use by a surf casting fisherman so that bait can be slid along the line after a cast has been made with a rod and reel.

The object of the invention is to provide a bait sliding attachment which will permit longer casts to be made and wherein several baited hooks can be slid along the line at selected time intervals for each cast so that there will be an increased possibility of a plurality of strikes being made as when the fisherman is casting from a sandy beach.

Another object of the invention is to provide an attachment which will permit a larger bait to be used in fishing for game fish so that there will be improved occular and olfactory responses whereby the possibility of strikes will be greatly increased without sacrificing the distance of cast, the present invention also providing a greater safety to the tackle and whereby new and fertile grounds to surf casters will be opened.

A further object of the invention is to provide a wave actuated bait carrying device which is adapted to be made from a single piece of non-ferrous metal wire and wherein the device is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view showing the device moving downwardly along the fishing line.

Figure 2 is a view similar to Figure 1 but showing the primary locking movement as when the waves cause the device to start locking on the line.

Figure 3 shows the device locked on the line due to the action of the incoming waves.

Figure 4 is a view illustrating a loop in the fishing line being inserted through the bait carrying device as when the device is being mounted on the line.

Figure 5 is a view illustrating a further step in mounting the device on the fishing line.

Figure 6 is a top plan view showing the bait carrying device mounted on the line.

Figure 7 is a fragmentary view showing the sliding bait tackle arrangement.

Figure 8 is a top plan view of a slightly modified arrangement.

Figure 9 is an end elevational view of the device of the present invention.

Referring in detail to the drawings, the numeral 10 designates generally the wave actuated bait carrying device which is adapted to be made of a single piece of non-ferrous metal wire or such metal wire that is substantially unaffected by salt water, and the device 10 is slidably mounted on the fishing line 11 as shown in the drawings. A short wire leader 14 depends from the device 10 for supporting a fishhook 12 as shown in Figure 1. In Figure 7 there is shown a portion of the fishing tackle for use with the device of the present invention wherein the numeral 15 designates a sinker line for attachment to a sinker or weight, and the sinker line 15 is connected to a retaining metal ring 16. A wire leader 17 is also connected to the retaining metal ring 16, and projecting from the wire leader 17 is a stop member 18 which serves to temporarily limit downward movement of the bait carrying device 10. A swivel 19 is connected to the wire leader 17, and a fishing line 11 from the reel is connected to the swivel 19.

The bait carrying device 10 includes a leg which is indicated generally by the numeral 21, and the leg 21 includes an upper portion 22 and a lower portion 23, the portions 22 and 23 being arranged angularly with respect to each other.

The lower end of the leg 21 terminates in a loop or eyelet 24 which has its free end twisted around the bottom of the leg 21 in order to create a closed loading eye 24.

The upper end of the leg 21 terminates in a U-shaped section 26, and depending from the U-shaped section 26 is a straight portion 27, Figure 5. The lower end of the straight portion 27 terminates in a transverse portion 28 which is arranged substantially at right angles with respect to the straight portion 27. A spacer bar 29 extends rearwardly from the transverse portion 28 and is arranged substantially at right angles thereto, and the rear end of the spacer bar 29 terminates in an angularly arranged web or end portion 30. An arm 31 extends forwardly at an angle from the web 30, and the arm 31 terminates in a finger 32 which extends parallel to the web or end portion 30. A crosspiece 33 which may include an offset intermediate portion extends downward from the finger 32 and forward to the leg 21, and the lower end of the crosspiece 33 may be twisted around the leg 21 as at 34 to create closed ends. Variations and modifications may be made within the scope of this invention by integrating two or more straight members into a circular construction thus avoiding right angular construction.

From the foregoing it is apparent that there has been provided a wave actuated bait carrying device that is adapted to be made from non-ferrous metal wire or such metal wire substantially unaffected by salt water and which consists of two loops spaced apart. The two loops are indicated generally by the numerals 35 and 36, the loop 35 being smaller than the loop 36 and wherein the loop 35 is partially defined by the finger 32, arm 31, web or end portion 30 and spacer bar 29. The larger loop 36 is defined by the upper portion 22 of the leg 21, the U-shaped section 26, the straight portion 27, a transverse portion 28 and the spacer bar 29. The smaller loop 35 is bent at an angle towards the larger loop 36 so that when a fishing line 11 is inserted through both loops as shown in the drawing, and the attachment is swung towards the shore by the action of the incoming wave as shown in Figures 2 and 3 on the baited hook, the line is bent by the web or end portion 30 and upper portion 32 of the smaller loop 35 to thereby create primary locking bends on the fishing line 11 as shown in Figure 2 before the baited hook 12 swings sufficiently to move the attachment.

The extent of the primary locking bends, which ends when the fishing line 11 reaches the top limit of the larger loop 36, is controlled by the setting of the angle of the smaller loop 35 in relation to the length of the larger loop 36. This setting may vary with extremes in conditions. The secondary locking bends which create a "step down" effect on the line commence when the primary locking bends end. After the device is fully locked on the line, by the primary and secondary locking bends as shown in Figure 3, it is prevented from slipping backwards toward the shore. In Figure 1 the arrow indicates movement of the device along the line 11 due to the action of the receding wave, while in Figures 2 and 3 the arrows indicate the direction of the waves which have a tendency to urge the device and baited hook back towards the shore. Thus, Figure 1 illustrates the attachment with the hook in traveling position and at the lower end of the device the loading eye 24 is provided so that a fishhook 12 can be attached by means of the short wire leader 14. A swivel 20 may be inserted in the loading eye in its construction as illustrated in Figure 2. That portion of the wire indicated by the numeral 21 is called a leverage leg which may be bent at any angle below the point of attachment of the other end of the wire to create an eccentric loading provision which controls the setting of the locking and releasing points before the baited hook 12 has a chance to swing sufficiently for backward travel. The placement of the loading eye 24 on the larger loop 36 causes the larger loop to become smaller and shorter when a powerful tension of a hooked game fish is exerted so that the chances of the fish being lost by having the retaining ring 16 forcing its way through the loop 36 by distorting the ring under tension is minimized. The top of the larger loop 36 is bent in the shape of an inverted U as at 26 and there are no sharp bends on the larger loop to cause structural weakness, or loose ends to become entangled in the line. A clearance space 37 is provided between the spacer bar 29 and the portions 21 and 33 and this space permits the fishing line to be slipped through the device in order to facilitate attaching the device to the line. The small heavy duty swivel 19 is small enough so that it can pass through both loops whereby the device will be retained in position for a strike by the stop portion 18 of the leader 17. Thus, the baited hook can be temporarily retained about four to nine feet from the sinker depending upon the length of the leader and the sinker line used and also the hook will be kept away from the rocks and reefs should the sinker get lodged in such objects whereby the hooks will be prevented from getting caught on such objects. When a fish strikes, the device will ultimately slide to the end of the wire leader 17 and be retained by the retaining metal ring 16.

The retaining metal ring 16 has a sinker attached thereto with a sinker line 15 which is weaker than the line 11 or the wire leader 17 to provide an expendable sinker for greater safety to the rest of the tackle.

In use after the cast is made using the previously described tackle rigging and with the pole placed in position, the directional bait sliding attachment including the wire 14, hook 12 and bait is attached to the line 11 by placing it alongside the line on the left side of the line with the larger loop 36 towards the water. In Figure 4 there is shown the first step in attaching the device to the line wherein the line is bent in the shape of a U and inserted below the spacer bar 29 between the portions 33 and 21 and then as shown in Figure 5, the looped line is extended below the baited hook 12 and the line can then be brought up on the opposite side of the device.

When the water recedes, the bait is placed within the reach the next incoming wave and the fishing line is lowered and held with a firm tension close to the ground and preferably is held or pinned down in this position until the attachment assembly reaches a point where it will be submerged even if the line is returned to normal position by reeling in the line. Each successive baited hook assembly should have a slightly longer wire leader 14 so that the baited hooks will not become tangled.

When used in the manner described above, it is possible to attach the baited hook assembly or assemblies at the water's edge from the shore and allowing the wave action to carry it to the end of the tackle arrangement in the water several hundred feet away or a full length of the cast.

The present invention utilizes the motion of the waves or live bait for directional travel by locking the device on the line in one direction while the device is free to travel in the other direction. In Figure 3 the device is shown locked on the line so that it cannot move backward even though the waves may tend to urge it towards the shore.

In Figure 8 there is shown a slightly modified device which is indicated generally by the numeral 10 and in Figure 8 the device 10' has its spacing bar 29' placed towards the viewer from the legs rather than away from the legs of the loops as in Figure 6. The device in Figure 8 is used in the same manner as the previously described bait carrying device.

The locking bends or locking portions of the device are in released position when the bait hangs in direct gravitational line from point of support so that when it swings slightly away from this line as shown in Figure 1 it is free to travel.

The present invention is not fixed to the tackle until after the cast is made and the fishing pole placed in position. Thus, in fishing for game fish a larger bait may be used without sacrificing distance of cast for improved occular and olfactory responses thereby greatly increasing the possibility of strikes without sacrificing the distance of cast. It has been the general practice to sacrifice the size of the bait for distance of cast. Also, with the present invention instead of reeling in the line periodically to inspect the bait, several baited hook assemblies may be attached and allowed to slide at selected intervals to position the bait on the line without reeling in the line.

Thus, while the sinker is attached in an expendable manner with a weaker line to the ring than the rest of the tackle, less sinkers are lost because only one cast is necessary instead of a plurality of casts. In fishing for game fishes that principally feed at night, the time selection of mounting the baited hook to the line being independent of the time of cast, will permit an accurate visual placement of the cast within a particular sand hole or channel during the ebbing daylight hours, preventing the small day feeding fishes from feeding on the bait by withholding it. It will also allow the fishermen to retain the exact position of the cast most likely to result in a strike all night without the need for bait inspection or replacement which would mean the loss of this critical placement. It would be almost impossible to accurately replace the cast at night after losing the position for bait inspection or replacement.

The plurality of safety measures incorporated in the tackle rigging of Figure 7 in combination with that inherent in a sliding attachment will open for fishing grounds heretofore avoided by fishermen using the bait casting method. Such grounds, spotted with rocks and reefs are ideal habitat for small fishes and other marine life and offer fertile grounds for game fishes.

Thus it is to be observed that the invention provides an increase in the possibility of strikes, a greater safety to the tackle and opens new and fertile grounds to surf casters.

Figure 1 represents the minimum condition necessary for operation of the device and the attachment must be close to the surface of the water or submerged to allow the water to actuate it by moving the bait and Figure 1 also shows the attachment in traveling position.

I claim:

As a new article of manufacture, a wave actuated directional bait carrying device comprising a forward loop and a rearward loop formed from a single length of non-corrosive wire-like material, said forward loop being larger than said rearward loop and comprising a vertically disposed leg having a lower portion and an upper portion arranged angularly with respect to each other, a U-shaped section extending from the upper end of said leg laterally in one direction to one side thereof, a forwardly and downwardly inclined portion extending from said U-shaped section, a portion arranged at right angles with respect to the lower end of said forwardly and downwardly inclined portion and extending laterally to one side thereof in a direction opposite to said U-shaped section, a rearwardly extending bar arranged angularly with respect to said last named laterally extending portion and extending therefrom for spacing said forward and rearward loops, said rearward loop comprising a portion extending laterally from the end of said spacer bar in the same direction as said U-shaped section, a forwardly and upwardly inclined portion extending from the end of said last named laterally extending portion, a finger extending laterally from the end of said last named inclined portion in a direction opposite to said U-shaped section, and a downwardly and forwardly inclined crosspiece extending from the end of said finger and having its lower end fixedly connected to said leg, said spacer bar being laterally spaced from said leg and crosspiece to provide a clearance for the passage of a fishing line, whereby a fishing line may be slipped through the clearance space and into the loops.

References Cited in the file of this patent

UNITED STATES PATENTS

| | | |
|---|---|---|
| 586,762 | Eaves | July 20, 1897 |
| 1,062,764 | Buckley | May 27, 1913 |
| 2,293,800 | Brown | Aug. 25, 1942 |
| 2,308,238 | Baker | Jan. 12, 1943 |
| 2,315,295 | Stogermayr | Mar. 30, 1943 |
| 2,316,500 | Bray | Apr. 13, 1943 |
| 2,545,326 | Westfall et al. | Mar. 13, 1951 |
| 2,564,260 | Houser | Aug. 14, 1951 |
| 2,626,438 | Powell | Jan. 27, 1953 |
| 2,644,263 | Allen | July 7, 1953 |
| 2,666,641 | Bonham | Jan. 19, 1954 |

FOREIGN PATENTS

| | | |
|---|---|---|
| 260,862 | Great Britain | Nov. 11, 1926 |